US005732814A

United States Patent [19]
Owczarzak et al.

[11] Patent Number: 5,732,814
[45] Date of Patent: Mar. 31, 1998

[54] METHOD AND APPARATUS FOR REDUCING NOISE AND WEAR IN A CONVEYOR TRANSITION SECTION

[75] Inventors: Thomas J. Owczarzak, Grand Rapids; Charles W. Bozarth, Holland; Frank W. Veit, Spring Lake, all of Mich.

[73] Assignee: Mannesmann Dematic Rapistan Corp., Grand Rapids, Mich.

[21] Appl. No.: 759,400

[22] Filed: Dec. 4, 1996

[51] Int. Cl.⁶ .................................................... B65G 47/46
[52] U.S. Cl. ........................... 198/890; 198/890.1; 198/370.2
[58] Field of Search ................................ 198/440, 449, 198/890, 890.1, 805, 370.2

[56] References Cited

U.S. PATENT DOCUMENTS

| | | |
|---|---|---|
| 3,167,171 | 1/1965 | Harmon et al. . |
| 3,731,782 | 5/1973 | Del Rosso ................... 198/439 |
| 4,138,008 | 2/1979 | Del Rosso ................... 198/365 |
| 4,143,752 | 3/1979 | Del Rosso ................... 198/890.1 |
| 4,618,052 | 10/1986 | Rickett et al. . |
| 5,127,510 | 7/1992 | Cotter et al. ................. 198/372 |
| 5,230,417 | 7/1993 | Sato et al. ................... 198/365 |
| 5,299,681 | 4/1994 | Kadono et al. ............... 198/690.1 |

FOREIGN PATENT DOCUMENTS

| | | |
|---|---|---|
| 0581291 | 2/1994 | European Pat. Off. . |
| 406227649 | 8/1994 | Japan . |

*Primary Examiner*—William E. Terrell
*Assistant Examiner*—Patrick H. Mackey
*Attorney, Agent, or Firm*—Van Dyke, Gardner, Linn & Burkhart, LLP

[57] ABSTRACT

A method and device in a conveyor for preventing the collision of guide pins on a transversely moving diverting shoe with the side of the conveyor in a conveyor having an endless conveying surface comprised of a plurality of surface members on which diverting shoes are slidably mounted to permit transverse movement thereon with respect to the direction of conveyance. The diverting shoes each have a downwardly depending guide pin which engages a rail network underlying the conveying surface. Magnets are positioned near the end of a diagonally oriented rail to attract the guide pins so as to prevent the transverse momentum of the guide pins and diverting shoes from carrying them into a collision with a stopping surface of the conveyor. The magnets are so positioned that non-diverted guide pins traveling adjacent the side of the conveyor are not substantially altered from their course of travel by the magnets.

22 Claims, 7 Drawing Sheets

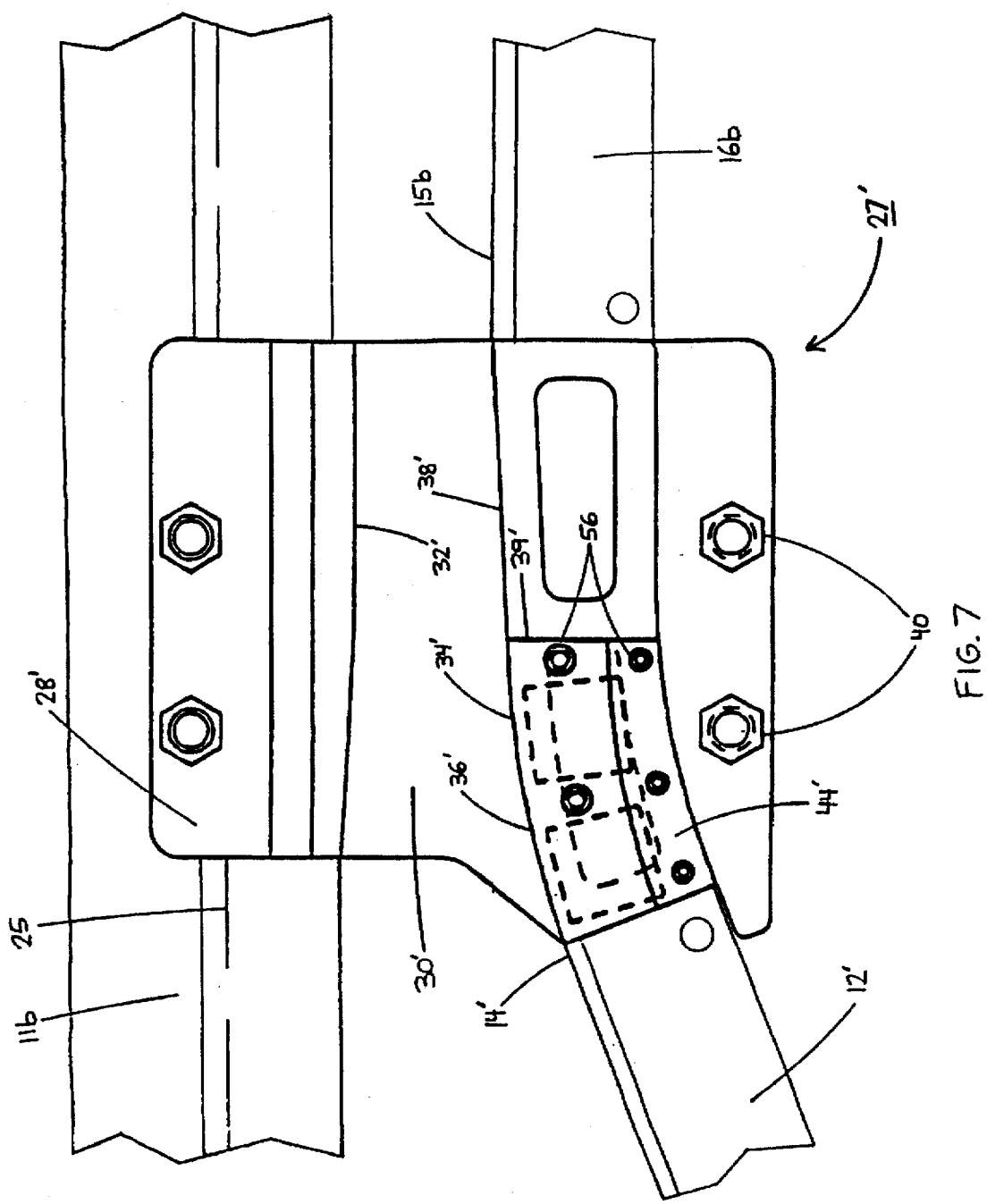

1

METHOD AND APPARATUS FOR REDUCING NOISE AND WEAR IN A CONVEYOR TRANSITION SECTION

BACKGROUND OF THE INVENTION

This invention relates generally to a method and device for reducing noise and wear in a conveyor system which utilizes transversely movable shoes or the like for diverting articles from the conveying surface. More specifically, this invention relates to the prevention of noise caused by the impact of downwardly depending guide pins on the transversely moving shoes with the side of the conveyor after they have moved transversely across the conveying surface.

Conveyor systems employing movable shoes for diverting articles off of the conveying surface onto branch conveyors, or the like, are known in the art. Such conveying systems have an endless array of parallel surface members, such as tubes or slats, which form the conveying surface upon which the articles to be conveyed are placed. Slidably mounted on one or more of the surface members is a shoe which is capable of moving up and down the surface member in a motion transverse to the direction of conveyor movement. When articles traveling on the conveying surface are not being diverted, the shoes are inactive and travel along the sides of the conveying surface without engaging the articles on the conveying surface. When a package is to be diverted, however, the shoes are diverted and move transversely across the conveying surface at a designated position on the conveying surface so as to divert an article traveling on the conveyor onto either a branch conveyor, an accumulation area, another portion of the conveying surface, or the like.

The activation and control of these shoes is accomplished by a network of rails and gates underlying the conveying surface. Each of the shoes has a guide pin, or the like, which depends downward from the shoe and may include a bearing which travels adjacent a side of an underlying guide rail. In an area of the conveyor where no packages are being diverted, the underlying guide rails run parallel to the direction of conveyance and are positioned near the sides of the conveying surface. The side guide rails prevent the shoes from drifting transversely and thus keep the shoes traveling near the sides of the conveying surface. In an area of the conveyor where packages are to be diverted, a divert rail oriented diagonally with respect to the direction of conveyance underlies the conveying surface. A gate or switch selectively transfers the guide pin of one or more shoes from the side guide rail to the diagonal divert rail. When a package to be diverted reaches this area, the gate or switch alters the path of travel of the shoes by switching the path of the guide pins from one along a path adjacent the side of the conveyor to a diagonal path defined adjacent the diagonal divert rail. In this manner, the shoes travel transversely across the conveying surface and push the adjacent traveling package onto the branch conveyor or accumulation area. Further details of the operation of such a conveying system are disclosed in U.S. Pat. No. 5,127,510, which is commonly assigned with the present application and the disclosure of which is hereby incorporated herein by reference.

A problem of noise and wear arises in positive displacement sorting conveying systems due to the impact of the guide pins with the side of the conveyor, or other stopping surface, after the diverting shoes have finished traveling across the conveying surface. The forward motion of the conveyor pushing the guide pins into the diagonally oriented divert rail produces the transverse force component on the shoes. This transverse force component is exerted while the guide pins are engaged against the diagonal divert rail, but ceases after the guide pins have reached the end of the divert rail. At the point of departure only the transverse inertia or momentum remains. This inertia causes the guide pins to continue to travel past the end or corner of the divert rail until the guide pins collide with the side of the conveyor.

With conveyor speeds reaching 540 feet/minute and beyond, and typically having at least two shoes per foot of conveyor length, it can be seen that the number of collisions occurring along the side of the conveyor can be quite large. Besides the problem of noise that these collisions cause, the side of the conveyor and the guide pins themselves are worn at an accelerated rate and replacement may be required.

One proposed solution to this problem is to provide a curved indentation along the side of the conveyor which receives the pins. Instead of directly stopping the pins, the curved indentation deflects their path to a desired parallel path along the side of the conveyor. This solution, however, is less than satisfactory because it does not completely stop the wear and tear on the pins and the side of the conveyor, but rather only reduces it by deflecting the impact. Further, after the pins have completed their travel along the curved indentation, the curvature tends to impart an inertial force in the opposite transverse direction, and the pins impact against the side guide rail. The curved indentation also requires additional structure which must extend downstream beyond the end of the divert rail and which therefore interferes with the ability to position another divert gate or switch immediately downstream of the divert rail.

Another proposed solution is to construct the side of the conveyor out of a high-impact plastic material, or to put a plastic shield on the side of the conveyor. While this reduces the wear on the pins and the sides somewhat, it does not eliminate the problem of noise but rather only alters the pitch. With these considerations in minds, it can be seen that there thus exists a need for a simple way of completely preventing the inertial impact of transverse moving guide pins with the sides of a conveyor that does not require additional downstream space.

SUMMARY OF THE INVENTION

The present invention is directed to a device and method which prevents the inertial impact of the transverse moving guide pins of a conveyor with the sides of the conveyor. By not involving structure which occupies significant additional downstream space, the present invention further allows another diverting gate to be located nearly immediately after the end of the divert rail.

An apparatus according to one aspect of the present invention includes at least one pin attraction device secured to a conveyor having a longitudinally moving conveying surface defined by a plurality of surface members connected to each other, and on which each surface member is moveably mounted a diverting shoe. The pin attraction device is secured to the conveyor near the junction of a first path angularly oriented with respect to the sides of the conveyor and a second path parallel and adjacent to one side of the conveyor. The pin attraction device is positioned sufficiently close to the first path to eliminate transverse momentum of guide pins traveling along the first guide path. The guide pins thereby are substantially prevented from colliding with the side, or other stopping surface, of the conveyor. The pin attraction device is further positioned far enough from the second guide path so that guide pins traveling along it are not altered from their course by the magnet. Preferably, the pin attraction device is a magnet.

A method according to one aspect of the present invention includes providing and securing at least one pin attraction device and positioning the pin attraction device at the end of a divert rail, which underlies the conveying surface and which is used to move the diverting shoes transversely across the conveying surface. The pin attraction device is positioned where the divert rail meets with a side guide rail that runs parallel to the direction of conveyance in order to substantially eliminate transverse momentum on the guide pins so that the guide pins do not collide with the side of the conveyor.

These and other objects, advantages and features of this invention will become apparent upon review of the following specification in conjunction with the drawings.

BRIEF DESCRIPTION OF THE DRAWINGS

FIG. 7 is a plan view of an alternate embodiment of the invention.

DESCRIPTION OF THE PREFERRED EMBODIMENT

Figure 1:
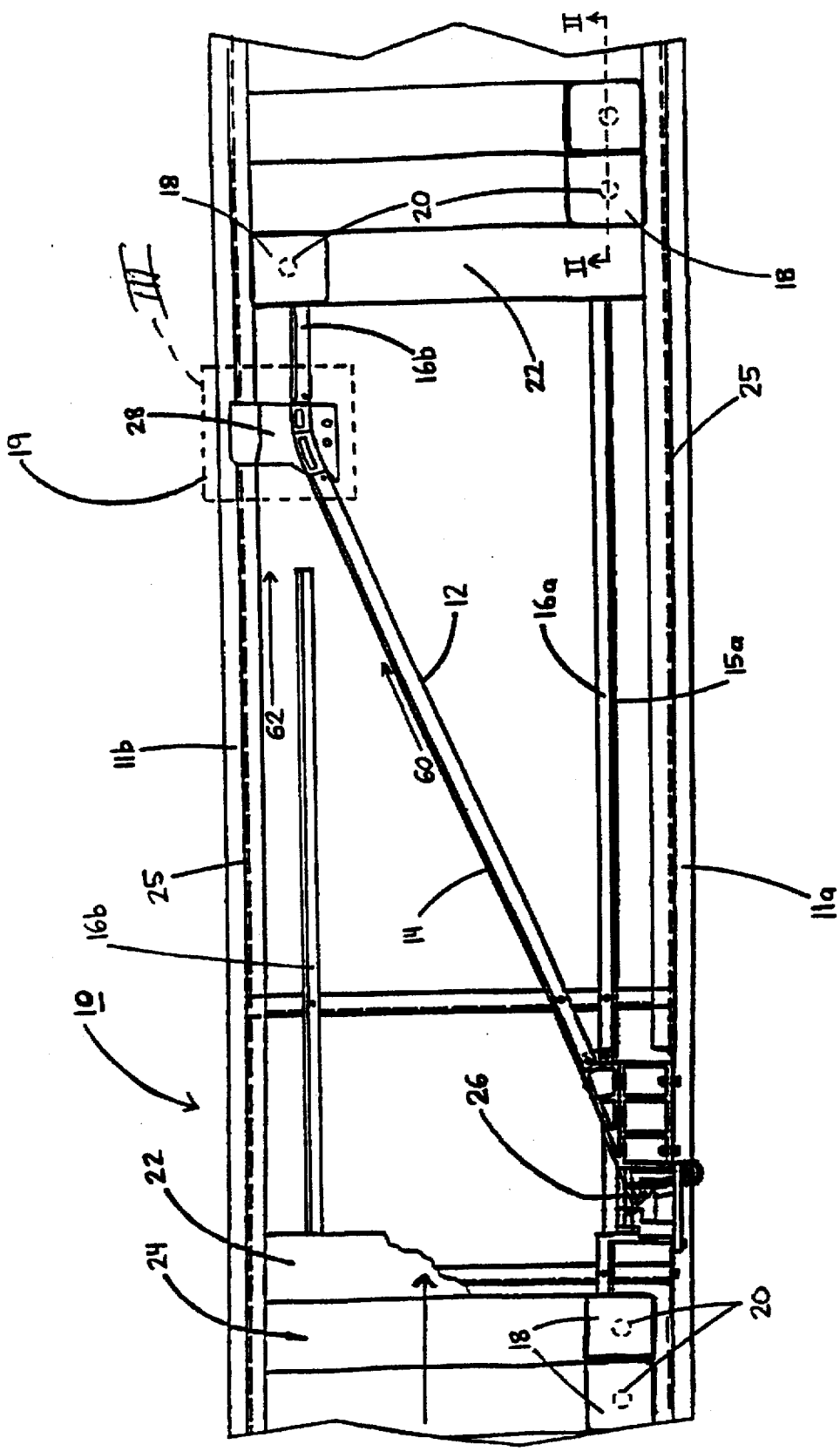
FIG. 1 is a top plan view of a conveyor system according to the invention.
Figure 2:
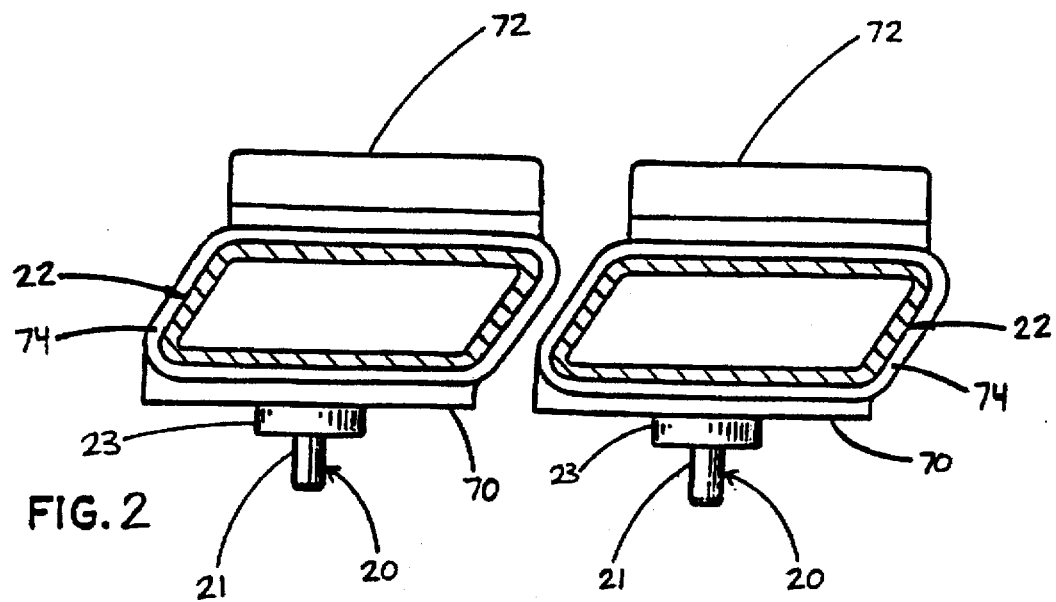
FIG. 2 is a sectional view taken along the line II—II in FIG. 1.

Referring now specifically to the drawings and the illustrative embodiments depicted therein, a conveyor 10 utilizing diverting shoes 18 is depicted with a middle portion of conveying surface 24 removed to reveal the underlying structure (FIG. 1). Conveying surface 24 is comprised of surface members, such as slats 22, which are aligned parallel to each other and form an endless conveying surface. Slats 22 are connected at their ends to chains 25, which move the slats in the direction of conveyance shown by the arrow. Initially positioned on either of the sides 11a and 11b of conveying surface 24 are diverting shoes 18 which are each individually mounted to a corresponding slat 22 in a manner which permits movement of the shoe up and down the length of the slat. Diverting shoes 18 have a top article engaging portion 72, a middle glide portion 74 which generally surrounds the perimeter of slat 22, and a bottom portion 70 which supports a downwardly depending guide pin 20 (FIG. 2). Guide pin 20 includes a shaft 21 and a concentric bearing 23. Diverting shoes 18 are prevented from drifting transversely when they are not being diverted by side rails 16a and 16b, which obstruct any transverse movement.

When an article is to be diverted off of conveyor 10, a switch or gate 26 diverts the path of the traveling diverting shoes 18 from that adjacent side rail 16a to a new path adjacent guide side 14 of a divert rail 12. The shoes are diverted transversely across conveying surface 24 by the combination of the forward movement of the conveyor and the engagement of concentric bearings 23 of guide pins 20 with guide side 14 of divert rail 12. As guide pins 20 move along divert rail 12, they ultimately reach a transition section generally designated 19 (FIG. 1). It will be understood that the gate or switch 26 is not part of the present invention, and that the present invention is not limited to conveyors having mechanical gates of the type illustrated in the accompanying drawings.

Figure 3:
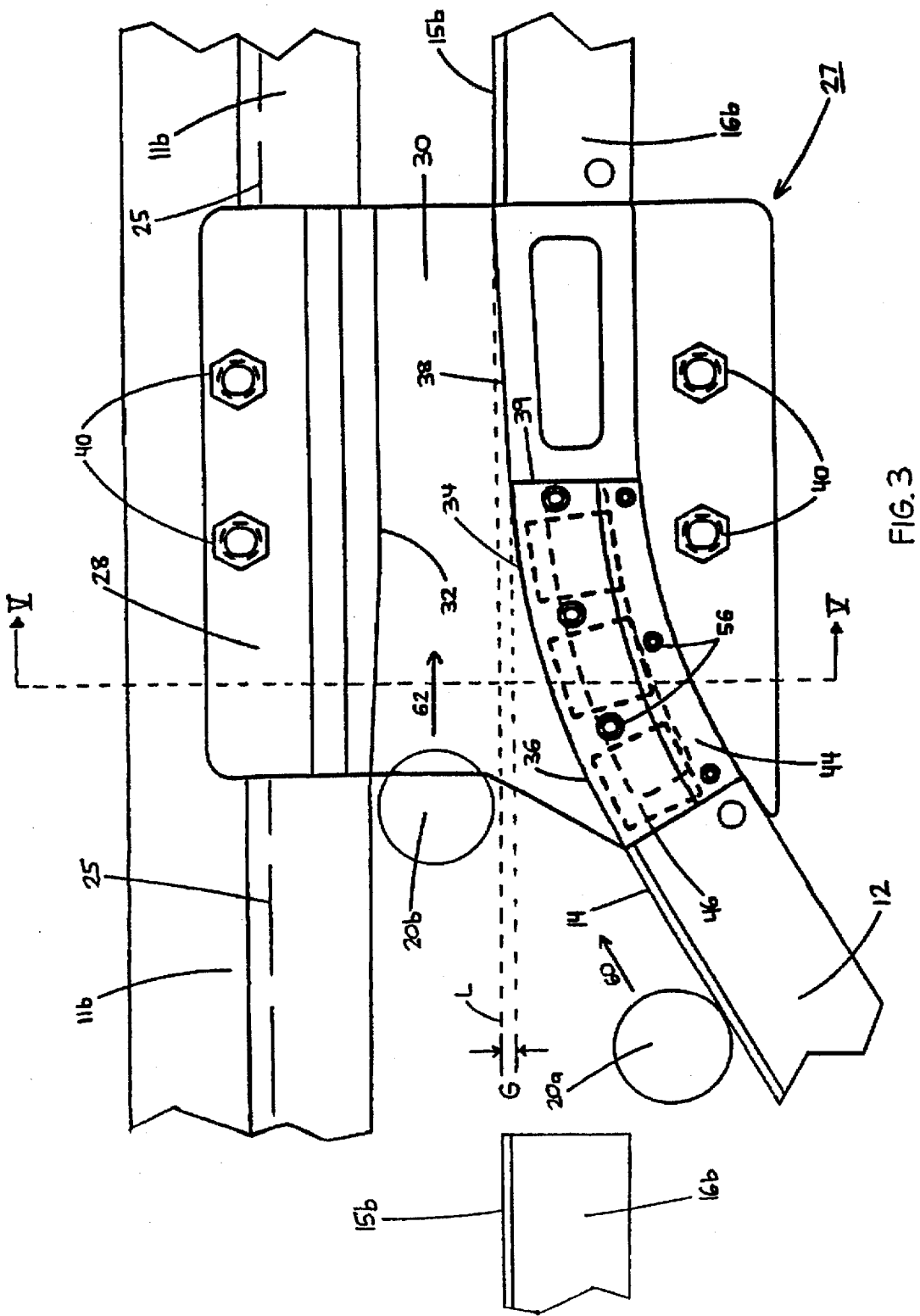
FIG. 3 is an enlarged view of the area of FIG. 1 designated III, illustrating a transition section.
Figure 4:
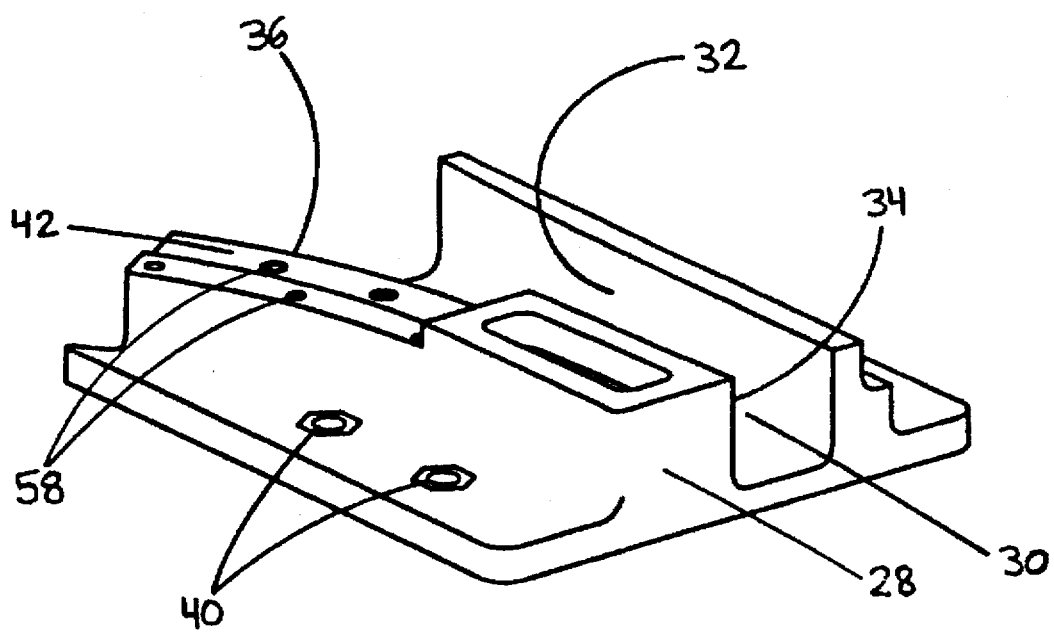
FIG. 4 is a perspective view of the base member in FIG. 3 with the magnet assembly removed.

Located in transition section 19 is noise and wear reducing apparatus 27 (FIG. 3). Noise and wear reducing apparatus 27 includes a base member or magnet member 28 and a magnet assembly 44 mounted thereon. Base member or magnet member 28 is joined at one end to divert rail 12 and at an opposite end to side guide rail 16b. Base member 28 has a channel 30 defined on one side by an outer edge 32 and on the other side by an inner edge 34 (FIGS. 3 and 4). Inner edge 34 further includes a radially curved portion 36 which meets a straight portion 38 at a junction 39. Base member 28 is secured to conveyor 10 by bolts 40 so that the upstream end of curved portion 36 aligns with guide side 14 of the end of divert rail 12. Base member 28 is also oriented so that the downstream end of straight portion 38 aligns with, and forms an angle with, guide side 15b of side rail 16b. In the preferred embodiment, base member 28 is constructed of urethane. A line L denotes an imaginary extension of guide side 15b of side rail 16b. A gap G is defined by the lateral distance between line L and junction 39 of curved portion 36 and straight portion 38 for a purpose that will be described in more detail below.

Figure 5:
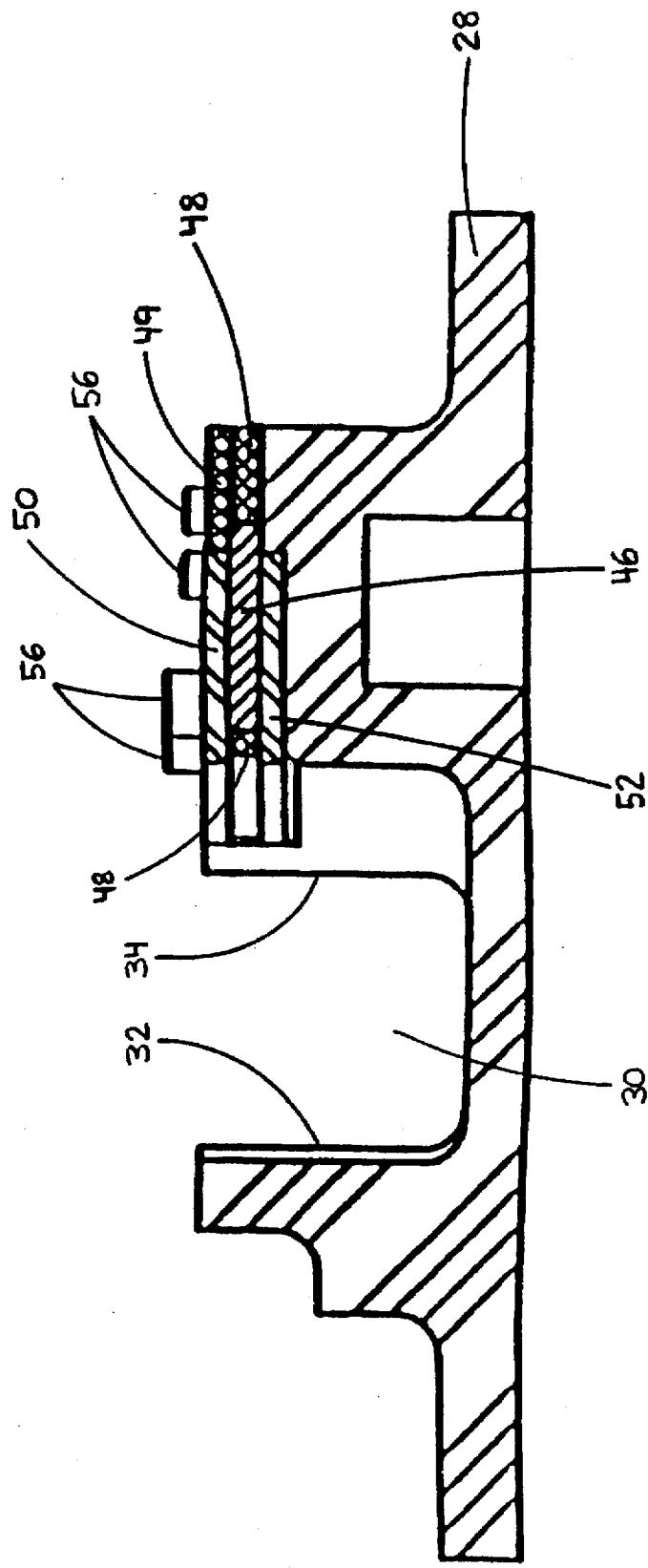
FIG. 5 is a sectional view taken along the line V—V in FIG. 3.
Figure 6:
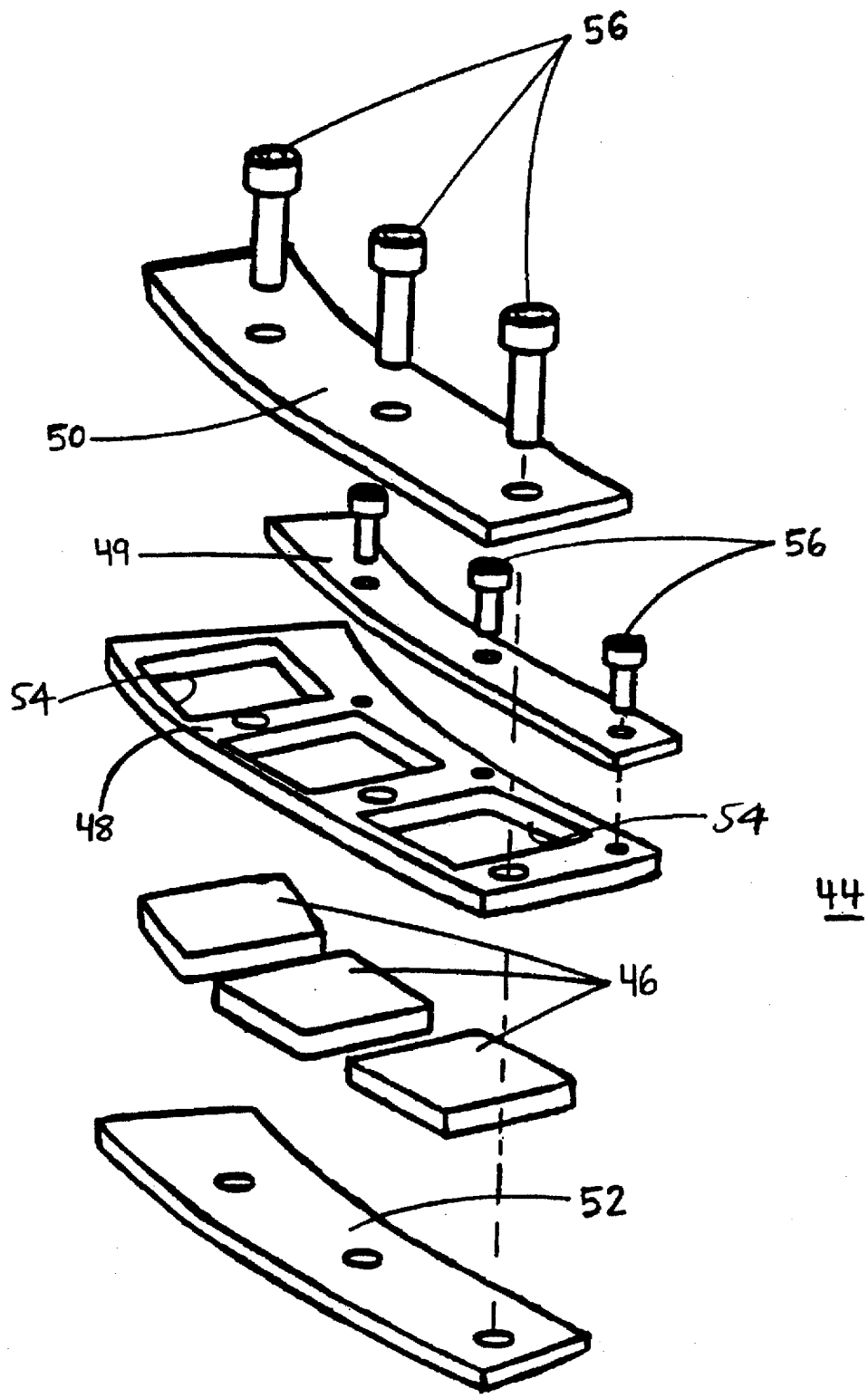
FIG. 6 is an exploded view of a magnet assembly.

Adjacent curved portion 36 on base member 28 is a recessed surface 42 on which magnet assembly 44 is mounted (FIGS. 5 and 6). Magnet assembly 44 includes a lower pole plate 52; a magnet holder 48 having apertures 54 in which magnets 46 are housed and which is positioned on top of lower pole plate 52; a magnet holder support 49 positioned on top of magnet holder 48; and an upper pole plate 50. Upper pole plate 50 is positioned on top of magnets 46, magnet holder 48, and magnet holder support 49. Magnet assembly 44 thus captures magnets 46 with magnet holder 48 between upper and lower pole plates 50 and 52. The layers of magnet assembly 44 are held together and mounted to base member 28 by non-magnetic screws or bolts 56 which insert into receiving holes 58 in base member 28 (FIG. 3). In the preferred embodiment, upper and lower pole plates 50 and 52 are made of steel, and magnet holder 48 and magnet holder support 49 are made from a non-magnetic material, such as aluminum. Other non-magnetic materials are also contemplated, including plastic. Screws or bolts 56 are also made of non-magnetically-attractable material, which, in the preferred embodiment, is stainless steel. Non-magnetic material is preferred because it does not substantially interfere with the magnetic flux configuration of the magnet assembly. Also, in the preferred embodiment, magnets 46 are made of neodymium, iron, and boron (Nd—Fe—B). The magnets 46 have a designated part number F0034-00121 as supplied by Ugimag Inc., located in Valparaiso, Ind. If more than one magnet 46 is placed in magnet assembly 44, the magnets are oriented, in the preferred embodiment, with their north magnetic poles all facing the same direction.

When conveyor 10 is in operation, guide pins 20 enter channel 30 in base member 28 of noise and wear reducing apparatus 27 from one of two paths. A first path 60 is adjacent divert rail 12 defined on one side by guide side 14 and is illustrated by guide pin 20a (FIG. 3). The pins following path 60 are in the final stages of being diverted transversely across conveying surface 24. A second path 62 is adjacent conveyor side 11b, and is illustrated by guide pin 20b. The pins following path 62 may have been previously diverted and are now traveling generally parallel to and adjacent conveyor side 11b. A guide pin 20 following first path 60 enters channel 30 adjacent curved portion 36. Guide pin 20 will be attracted by magnets 46 and thereby remain in contact with curved portion 36 as guide pin 20 travels along curved portion 36 due to the magnetic attraction of magnets 46. By concentric bearing 23 of guide pin 20 staying in contact with curved portion 36, the direction of travel of the guide pin is gradually changed from a lateral direction to a longitudinal direction and the guide pin is prevented from impacting with outer edge 32, or other stopping surface, thus preventing the noise and wear problem such impact would cause.

A pin entering channel 30 from second path 62 may already have been previously diverted at an upstream point, or in the case of a two way sorter, is in position to push an article to the opposite side of the conveyor. In any event, it is desirable that this pin pass through channel 30 of base member 28 without being diverted off course by magnets 46. Were pins to be diverted off course by magnets 46, they would collide with inner edge 34 of magnet member or base member 28 which would result in noise and wear on the concentric bearings 23 and magnet member or base member 28. This problem is avoided by the inclusion of a lateral gap G between the line L, defined by an extension of guide side 15b of side rail 16b, and the junction 39 of curved portion 36 and straight portion 38. Since line L also defines the lower side of second path 62, gap G represents the closest distance that guide pins 20 traveling along second path 62 will ever come to magnets 46. The smaller the gap G, the closer the guide pins 20 on second path 62 will come to magnets 46, and the stronger will be the magnetic force exerted on these guide pins by magnets 46. Thus, if gap G is made too small, guide pins 20 on second path 62 will experience sufficient attractive force to alter their generally linear path and may collide with inner edge 34, creating an additional noise and wear problem which is undesirable.

If, on the other hand, gap G is made too large, a greater transverse force will be imparted on guide pins 20 following path 60 during their travel along straight portion 38, due to its slightly angled orientation with respect to conveyor sides 11a and 11b. Because this transverse force is imparted upstream of magnets 46, it will be unabated by magnets 46, and thus can lead to impacts of guide pins 20 with the conveyor side The distance of gap G is determined by the angle with which straight portion 38 meets guide side 15b of side rail 16b, and can be altered by varying the dimensions of base member 28. In the preferred embodiment, the distance of gap G is about 0.2 inches.

An alternate noise and wear reducing apparatus 27' includes a base member 28' having a smaller curved portion 36', and a magnet assembly 44' having only two magnets 46 (FIG. 7). Fewer magnets are used in this embodiment because the angle of diver rail 12' with respect to side 11b of conveyor 10 is less than in the previous embodiment. In the previous embodiment, which had three magnets 46, the angle of divert rail 12 with respect to side 11b was 30°. In this embodiment, which has only two magnets 46, divert rail 12' is oriented with respect to side 11b at an angle of 20°. With a smaller angle, only two magnets are needed to change the direction of shoe travel from the 20° divert angle to the direction of conveyor travel since the length of the 20° path is shorter than that of the 30° path.

While the invention has been described with reference to the two embodiments shown in the attached drawings, it will be understood that the invention is not limited to these two embodiments. For example, it will be appreciated that the invention is not limited to embodiments having only two or three magnets, but includes those having any number of magnets. It also may include the use of one or more electromagnets instead of permanent magnets. As another example, it will be appreciated that the invention is not limited to providing a curved path for the guide pins, but could include any geometric shape or combination of shapes against which the magnets or other pin attraction devices can retain the guide pins.

The environment of the invention is also not limited specifically to the type of conveyor systems described herein. The invention can be employed in any type of conveying system which has transversely moving parts which are guided by tracks, or the like, located underneath the conveying surface. The tracks need not be identical to those illustrated herein but could, for example, include divert rails that are curved instead of being linear.

Also, it will be understood that the invention is not limited to the single location in the conveyor as depicted in FIG. 1. Rather, as one example, the present invention finds equal applicability for use during the return journey of the conveying surface. When the forward moving conveying surface reaches the end of the conveyor, it begins its return journey back to the beginning of the conveyor, which typically takes place underneath the conveyor. To ensure that the returning conveying surface arrives at the beginning of the conveyor with the diverting shoes positioned on the side or sides desired for the forward trip, it is necessary to be able to move the diverting shoes from one side of the conveyor to the other during the return journey. This is accomplished in a similar manner as is done to divert the shoes in the forward direction; namely, through the use of divert rails and possibly, but not necessarily, diverting gates or switches. Like in the forward moving conveying surface, the problem of noise and wear due to the impact of the guide pins with the conveyor side arises, and can be eliminated through the use of the present invention.

Finally, while this invention has been described in terms of specific embodiments and environments, modifications to either of these in addition to those specifically described herein may be made without departing from the true spirit and scope of the invention as defined in the appended claims.

The embodiments of the invention in which an exclusive property or privilege are claimed are defined as follows:

1. In a conveyor having a longitudinally moving conveying surface defined by a plurality of surface members connected to each other in spaced relation; a plurality of diverting shoes each moveably mounted on at least one of said surface members for transverse movement with respect to said conveying surface; and a rail network underlying said conveying surface which includes a divert rail angularly oriented with respect to a side of the conveyor for engaging guide pins depending from said diverting shoes and for imparting a transverse force on said diverting shoes to move said diverting shoes across said conveying surface to another side of said conveying surface, said divert rail defining an adjacent first path and said side of said conveyor defining a second path oriented substantially parallel to said side of said conveyor; a noise and wear reducing apparatus positioned at a transition section adjacent a merger of said first and said second paths, said noise and wear reducing apparatus comprising:

at least one pin attraction device in said transition section to substantially eliminate transverse momentum of guide pins traveling along said first path by an attraction force of said pin attraction device, wherein guide pins traveling in said second path are not substantially altered from said second path by said attraction forces of said pin attraction device.

2. The noise and wear reducing apparatus of claim 1 wherein said pin attraction device is comprised of at least one magnet.

3. The noise and wear reducing apparatus of claim 2 wherein said at least one magnet is a permanent magnet.

4. The noise and wear reducing apparatus of claim 2 further including:
   a lower pole plate;
   a housing member having apertures equal in number to the number of said at least one magnet and shaped to house said at least one magnet, said housing member positioned on said lower pole plate and said at least one magnet positioned in said apertures; and,
   an upper pole plate positioned on said housing member whereby said upper pole plate, said lower pole plate, and said housing member are all secured together and to said conveyor in said transition section.

5. The noise and wear reducing apparatus of claim 4 wherein said housing member is constructed of non-magnetically-attractable material.

6. The noise and wear reducing apparatus of claim 4 wherein said housing member, said lower pole plate, and said upper pole plate are secured to said conveyor and to each other by fasteners made of a non-magnetically-attractable material.

7. The noise and wear reducing apparatus of claim 5 wherein said non-magnetically-attractable material is stainless steel.

8. The noise and wear reducing apparatus of claim 6 wherein said non-magnetically-attractable material is aluminum.

9. The noise and wear reducing apparatus of claim 2 wherein said at least one magnet is made of Nd—Fe—B.

10. In a conveyor having a longitudinally moving conveying surface defined by a plurality of surface members connected to each other in spaced relation; a plurality of diverting shoes each moveably mounted on one of said surface members for transverse movement with respect to said conveying surface; and a rail network underlying said conveying surface which includes a divert rail angularly oriented with respect to the sides of the conveyor for engaging guide pins depending from said diverting shoes and for imparting a transverse force on said diverting shoes to move said diverting shoes from one side of said conveying surface to another side of said conveying surface; a noise and wear reducing apparatus, comprising:
   a first path for guide pins defined on one side by said divert rail, said divert rail having an end near one of said sides of said conveyor;
   a base member secured to said conveyor adjacent said end of said divert rail, said base member defining a corner in said first path; a second path for guide pins defined on one side by one of said sides of said conveyor and defined on another side by a line parallel to said sides of said conveyor, said second path merging with said first path at said base member; and
   at least one magnet secured to said base member in a position adjacent said corner of said first path so that said at least one magnet exerts a magnetic force on guide pins traveling in said first path sufficient to keep said guide pins traveling adjacent to said corner so that said guide pins do not impact with a stopping surface of said conveyor.

11. The noise and wear reducing apparatus of claim 10 wherein said corner defined by said base member further includes:
   a curved portion in contact with said end of said divert rail; and
   a straight portion adjoining said curved portion and defining a junction, said curved portion and said straight portion further defining an inner guide edge on said base member.

12. The noise and wear reducing apparatus of claim 11 wherein said guide pins depending from said diverting shoes further include:
   a shaft having a lower and upper end; and,
   a concentric bearing on said upper end of said shaft, said concentric bearing being substantially retained in contact with at least said curved portion of said base member by said magnetic force of said at least one magnet.

13. The noise and wear reducing apparatus of claim 11 wherein said at least one magnet is positioned adjacent said curved portion of said base member.

14. The noise and wear reducing apparatus of claim 10 further including a gap defined as the shortest distance between said line defining said another side of said second path and said junction of said curved portion with said straight portion of said base member.

15. The noise and wear reducing apparatus of claim 14 wherein said gap is sufficiently large so that guide pins traveling in said second path are not substantially altered from their course of travel by said at least one magnet.

16. The noise and wear reducing apparatus of claim 15 wherein said at least one magnet is housed in a magnet assembly comprising:
   a lower pole plate;
   a housing member having apertures equal in number to the number of said at least one magnet and shaped to house said at least one magnet, said housing member positioned on said lower pole plate and said at least one magnet positioned in said apertures; and,
   an upper pole plate positioned on said housing member whereby said upper pole plate, said lower pole plate, and said housing member are all secured together and to said base member adjacent said curved portion of said base member.

17. The noise and wear reducing apparatus of claim 16 wherein said upper pole plate, said housing member, and said lower pole plate are all secured together by fasteners made out of non-magnetically-attractable material.

18. In a conveyor having a longitudinally moving conveying surface defined by a plurality of surface members connected to each other in spaced relation; a plurality of diverting shoes each moveably mounted on one of said surface members for transverse movement with respect to said conveying surface; and a rail network underlying said conveying surface which includes a first path defined by a divert rail angularly oriented with respect to the sides of the conveyor for engaging guide pins depending from said diverting shoes and for imparting a transverse force on said diverting shoes to move said diverting shoes from one side of said conveying surface to another side of said conveying surface; a second path defined by a rail substantially parallel to the side of the conveyor for engaging said guide pins, and a transition section adjacent a merger of said first and second paths; a method for preventing the impact of said guide pins with a stopping surface of said conveyor after said guide pins reach the end of said angularly oriented divert rail comprising the steps of:
   providing at least one pin attraction device in said transition section; and positioning said at least one pin attraction device adjacent said end of said divert rail so as to substantially eliminate transverse momentum on said guide pins and diverting shoes so that said guide pins traveling alongside said divert rail do not collide with one of said sides of said conveyor.

19. The method of claim 18 wherein said at least one pin attraction device is at least one permanent magnet.

20. The method of claim 19 further including the steps of:

providing a housing member for said at least one permanent magnet;

positioning said at least one permanent magnet in said housing member; and fastening a lower pole plate and an upper pole plate to said housing member.

21. The method of claim 20 wherein said fastening of said lower pole plate and said upper pole plate to said housing member is accomplished by using fasteners made of a non-magnetically-attractable material.

22. The method of claim 21 wherein said at least one permanent magnet is made of Nd—Fe—B.

\* \* \* \* \*